United States Patent [19]

Mühlberger et al.

[11] Patent Number: 4,541,878
[45] Date of Patent: Sep. 17, 1985

[54] CAST IRON WITH SPHEROIDAL GRAPHITE AND AUSTENITIC-BAINITIC MIXED STRUCTURE

[75] Inventors: Horst Mühlberger, Staufenstrasse 29, D-6000 Frankfurt/Main; Brüno Prinz; Wolf Wünder, both of Oberursel; Ulrich Schäfer, Weisloch; Josef Bognar, St. Leon-Rot, all of Fed. Rep. of Germany

[73] Assignee: Horst Mühlberger, Frankfurt/Main, Fed. Rep. of Germany

[21] Appl. No.: 562,999

[22] Filed: Dec. 16, 1983

Related U.S. Application Data

[63] Continuation of Ser. No. 446,245, Dec. 2, 1982, abandoned, which is a continuation-in-part of Ser. No. 255,999, Apr. 21, 1981, abandoned, which is a continuation-in-part of Ser. No. 153,827, May 27, 1980, abandoned.

[51] Int. Cl.$^4$ ................................................ C21D 5/06
[52] U.S. Cl. ..................................................... 148/139
[58] Field of Search ........................ 148/35, 139, 138; 75/123 CB

[56] References Cited

U.S. PATENT DOCUMENTS

| | | | |
|---|---|---|---|
| 3,273,998 | 9/1966 | Knoth et al. | 148/35 |
| 3,549,431 | 12/1970 | de Castelet | 148/35 |
| 3,860,457 | 1/1975 | Vourinen et al. | 148/35 |
| 3,893,873 | 7/1975 | Hanai et al. | 75/123 CB |
| 4,222,793 | 9/1980 | Grindahl | 148/35 |

*Primary Examiner*—Peter K. Skiff
*Attorney, Agent, or Firm*—Karl F. Ross; Herbert Dubno

[57] ABSTRACT

A high ductility machinable cast iron with mixed austenitic-bainitic structure is made by a method which involves limiting the manganese content to less than 0.3% by weight and utilizing a substantially lower temperature austenitizing heat treatment (820° to 830° C.) for a shorter period (10 to 25 minutes) than has hitherto been considered to be necessary to achieve such structures. The low alloy cast iron can therefore be made from available scrap with low manganese content and at low cost.

3 Claims, No Drawings

CAST IRON WITH SPHEROIDAL GRAPHITE AND AUSTENITIC-BAINITIC MIXED STRUCTURE

CROSS REFERENCE TO RELATED APPLICATIONS

This application is a continuation of Ser. No. 446,245, filed Dec. 2, 1982, which is abandoned, continuation-in-part of Ser. No. 255,999 filed Apr. 21, 1981, abandoned, a continuation-in-part of Ser. No. 153,827 filed May 27, 1980 now abandoned.

FIELD OF THE INVENTION

My present invention relates to a cast iron with spheroidal graphite and of austenitic-bainitic mixed structure formed by a corresponding heat treatment and cooling and a process for its manufacture. More specifically the invention relates to the development of a new ductile spheroidal graphite cast iron (Germanite) which can be produced at lower cost, with a lower carbon content in the austenite and with improved machinability.

BACKGROUND OF THE INVENTION

A spheroidal graphite cast iron can be used as a structural material for realms where until now, heat-treated steels have been used exclusively, e.g. crankshafts for high-speed-Diesel engines, segmented shafts and pistons for hydraulic steering, trailer under-carriage kingpins for truck undercarriage couplings, driveshaft heads for motor vehicle drive shafts and coupling bodies for trailer couplings.

Among spheroidal graphite cast irons, types with a bainitic structure have been known and in use for a long time as materials with high tensile strength and high resistance to abrasion. For these materials, the cast bodies are heated to and held during the manufacture in general at austenitizing temperatures of 920° C. to 950° C. for 2 to 5 hours until the matrix carbon content has become more or less evenly distributed and any ledeburite, which might be present after casting, has been dissolved.

Reference may be had to U.S. Pat. No. 3,893,873, No. 3,273,998, No. 4,222,793, No. 3,549,431, and No. 3,860,457 in this regard.

After the austenitization, the castings are cooled down so rapidly that premature austenite transformation into pearlite, prior to reaching the isothermal bainite transformation temperature, is avoided. The casting is held at this temperature until the bainite reaction has been completed. Thereafter, as usual, it is cooled to room temperature (Giesserei 65 (1978) No. 4, pages 73 to 80).

There are also spheroidal graphite cast irons with a bainite structure, which derive from alloyed cast iron, where directly in connection with the cooling process following the casting process, a bainite reaction is produced because of the content of nickel, molybdenum, copper, manganese and possibly also chromium, depending upon the wall thickness of the casting (German patent document DE-OS No. 18, 08, 515).

A slightly alloyed spheroidal graphite cast iron with conventional quantities of carbon, silicon, phosphorus, sulphur and magnesium, a molybdenum content of 0.10 to 0.26% and a manganese content of 0.3 to 1.4% is also known from German patent document DE-OS No. 23, 34, 992. The casting which consists of the above is heat treated to an austenization temperature of 900° C. and after being held at this temperature for a period of two hours, is cooled in a bath at 300° C. in 10 minutes to 4 hours. As a result of these measures it is possible to obtain an austenite-bainite structure, which gives a tensile strength of 1100 N/mm$^2$, an elongation to break of 10% and a hardness of 270 to 300 HB. (All percents are given by weight).

OBJECTS OF THE INVENTION

It is an object of the present invention to provide an improved spheroidal graphite cast iron with an austenitic-bainitic mixed structure, without interfering with favorable properties.

Another object is to provide an improved method of making such a cast iron.

It is also an object to extend the principles set forth in my above-identified applications.

DESCRIPTION OF THE INVENTION

These objects are attained with a spheroidal graphite cast iron which has according to the invention, apart from the usual amounts of carbon, silicon, phosphorus, sulfur and magnesium, also >0 to <0.3%, preferably 0.01 to 0.25% manganese.

More specifically, the present invention relates to a method of making a highly machinable, low cost cast iron of mixed austenitic-bainitic structure, in which a spheroidal cast iron having less than 0.3% by weight manganese, but more than a trace amount thereof and more advantageously between 0.01 and 0.25% by weight manganese (most preferably 0.18 to 0.20% by weight), 0.2 to 0.8% by weight molybdenum (preferably more than 0.25% by weight molybdenum and most preferably 0.35 to 0.45% by weight molybdenum and even up to 0.4% by weight molybdenum), 0.1 to 1.5% by weight copper (preferably at least 0.4% by weight copper and most advantageously 0.6 to 0.8% by weight copper), substantially 2.5 to 3.7% by weight carbon and more preferably at least 3.0% by weight carbon (with best results at 3.5 to 3.7% by weight carbon although excellent results are obtained with values of 3.0 to 3.2% by weight), 2.0 to 3.0% by weight silicon and preferably upwards of 2.2% by weight silicon (with best results between say 2.6 to 2.8% by weight silicon) the balance being substantially iron and, as noted below, possibly nickel.

While the system of the present invention is effective without nickel, it has been found that nickel in an amount of 0.01 to 3% by weight and preferably 1.0 to 1.5% by weight is advantageous, as long as the nickel and copper content together is greater than or equal to 1.0% by weight and preferably between 1.5 and 2.3% by weight. In any event, the copper content should not exceed 1.5% by weight because at levels above this value undesirable phases are formed at the grain boundaries.

The spheroidal graphite cast iron is effective to form an austenitic-bainitic structure wherein, according to the invention, the cast iron is subjected to austenitizing heat treatment at a temperature of 800° to 860° C., preferably 820° to 830° C., for a period of 10 to 60 minutes, preferably 10 to 25 minutes, and is then fast cooled in less than 2 minutes to a temperature of 350° to 400° C., preferably 360° C. to 375° C. and is held at this temperature for a period of 5 to 60 minutes, preferably 20 to 25 minutes. Thereafter a cooling to room temperature is effected.

We have discovered, quite surprisingly, that it is possible to carry out a low-temperature austenitizing heat treatment for substantially shorter periods than have hitherto been found to necessary to effect the desired transformation to the mixed austenitic-bainitic structure with especially low levels of manganese. In fact, it has hitherto been thought to be necessary to operate at relatively high austenitic transformation temperatures (900° C. and above for prolonged periods, e.g. an hour or more) even with high levels of alloying elements such as manganese (0.3% by weight and more) and that only with increasing alloy contents could one conceive of promoting the austenitic transformation, especially in castings with a wall-thickness over about 1 inch up to 4 inches or more.

We have now found, diverging from the principle hitherto considered inviolate, that with manganese contents up to 0.25%, within the other compositional limits set forth, it is possible to reduce the austenitization heat treatment temperature to 820° to 830° C. and the austenitization heat treatment time to some 10 to 25 minutes while yielding a highly machinable product.

The cost of this product is substantially lower than earlier cast irons with austenitic-bainitic structure, not only because of the reduced content of expensive alloying elements, but also because of the reduced heat treatment time and temperature minimized energy costs which increasingly enter into the total cost of metallurgical products.

The product is a highly machinable low cost cast iron resembling malleable steel which can be fabricated using available, i.e. manganese containing, scrap iron with little or no addition of nickel.

When the body is cast into bodies of small wall thickness, the molybdenum can be omitted and the amounts equivalent to the molybdenum quantity recited of chromium, vanadium or magnesium may also be present but preferably are excluded.

The rapid cooling step should preferably take only about 15 seconds maximum to the bainite temperature of about 360° C.

SPECIFIC EXAMPLE

A cast iron is formed from 0.19% by weight manganese, 0.40% by weight molybdenum, 0.6% by weight copper, about 3.6% by weight carbon, 2.6% by weight silicon and about 1.0% by weight nickel. The balance was substantially iron. After casting, the body was subjected to an austenitic heat treatment for 15 minutes at a temperature of 825° C. and thereafter cooled over a period of max. 15 seconds to about 360° C. to 375° C. at which the body was held for 20 to 25 minutes. A high strength, high machinability cast iron was thereby obtained with an excellent austenite-bainite mixed structure and high machinability.

The mechanical properties of the cast iron body were retained when the austenization temperature was varied between 820° to 830° C. and the austenization time between 10 and 25 minutes.

The mechanical properties were maintained when the manganese content was varied between 0.18 and 0.20% by weight, the molybdenum content between 0.25 and 0.45% by weight, the copper content from 0.6 to 0.8% by weight, the carbon content between 3.5 to 3.7% by weight, the silicon content between 2.6 to 2.8% by weight and the nickel content between 1.0 and 1.5% by weight, the total nickel and copper being between 1.5 and 2.3% by weight.

I claim:

1. A method of making a cast iron of mixed austenitic-bainitic structure, which consists essentially of the steps of:
    forming a spheroidal graphite cast iron composition containing 0.01 to 0.25% by weight manganese, 0.1 to 1.5% by weight copper, 2.5 to 3.9% by weight carbon, 2.0 to 3.0% by weight silicon, 0.2 to 0.8% by weight molybdenum, 0.01 to 3% by weight nickel, and the balance iron;
    subjecting the cast iron to an austenitic heat treatment for 10 to 25 minutes at a temperature of 820° to 830° C.;
    rapidly cooling the resulting austenitized cast iron to a temperature of substantially 350° to 400° C. over a period of less than 2 minutes; and
    holding the cast iron after the rapid cooling at the latter temperature for a period of 5 to 60 minutes, thereby forming a readily machinable product contrasting with cast irons containing more than 0.3% by weight manganese by reduced hardness and greater ductility.

2. The method defined in claim 1 wherein said cast iron is cooled from the austenitic heat treatment temperature to a temperature of substantially 360° C. to 375° C. over a period of at most 15 seconds, said cast iron being held at the temperature of substantially 360° to 375° C. for a period of 10 to 25 minutes.

3. The method defined in claim 2 wherein said cast iron has a composition of 0.18 to 0.20% by weight manganese; 0.35 to 0.45% by weight molybdenum, 0.6 to 0.8% by weight copper, 3.5 to 3.7% by weight carbon, 2.6 to 2.8% by weight silicon, 1.0 to 2.5% by weight nickel, the balance iron, the total of nickel and copper being between 1.5 and 2.3% by weight.

* * * * *